G. L. BOURQUIN & R. LOEB.
EMBROIDERY TRIMMING MACHINE.
APPLICATION FILED AUG. 21, 1912. RENEWED MAY 14, 1915.

1,144,320.

Patented June 22, 1915.
7 SHEETS—SHEET 4.

UNITED STATES PATENT OFFICE.

GUSTAVE LOUIS BOURQUIN, OF SELLERSVILLE, PENNSYLVANIA, AND RUDOLF LOEB, OF CAMDEN, NEW JERSEY, ASSIGNORS TO RUDOLF LOEB, OF JENKINTOWN, PENNSYLVANIA.

EMBROIDERY-TRIMMING MACHINE.

1,144,320. Specification of Letters Patent. Patented June 22, 1915.

Application filed August 21, 1912, Serial No. 716,160. Renewed May 14, 1915. Serial No. 28,204.

*To all whom it may concern:*

Be it known that we, GUSTAVE LOUIS BOURQUIN and RUDOLF LOEB, citizens of the United States, and residents of Sellersville, Bucks county, Pennsylvania, and Camden, Camden county, New Jersey, respectively, have invented certain Improvements in Embroidery-Trimming Machines, of which the following is a specification.

Our invention relates to mechanical means for cutting or trimming embroidery edging; the machine forming the subject of our invention being particularly adapted for cutting or separating the waste from that form of embroidery known as "Hamburg edging." As is well known, such embroidery comprises a series of scallops or festoons, usually curved, forming edges of varied contour extending substantially in a straight line and produced by means of buttonholes or other stitching in the body of a sheet or strip of material; which stitching has the effect of providing a raised surface consisting of a number of projections substantially hard or firm and of an ornamental character. As noted, this form of embroidery is manufactured in the form of a strip or sheet of material containing a plurality of embroidered lines which subsequently form the "edgings" of commerce, and when such edgings are used as trimmings for garments or for other purposes, it is necessary to operate the waste from the embroidered edge, and the object of our invention is to provide mechanically operated means for accomplishing this work.

A further object of our invention is to facilitate the work of the cutting blade and insure a perfect trimming action without danger of damaging the goods operated upon, and a still further object is to provide for the automatic feeding of the trimmed fabric simultaneously with the cutting operation.

Our present invention is in the nature of improvements upon the structure shown in our pending applications filed November 18, 1909, Serial No. 528,725, and August 23, 1910, Serial No. 578,545, and relate more particularly to mechanism for guiding the endless reciprocating knife or cutter, and mechanism for feeding the goods to and away from the cutting point and maintaining the same under proper tension while being so fed.

These and other features of our invention will be more fully pointed out hereinafter, reference being had to the accompanying drawings, in which:

Fig. 7, and Fig. 19, is a sectional view on the line 19—19, Fig. 6, illustrating a detail of the anvil adjusting means.

In our companion application before referred to, filed November 18, 1909, Serial No. 528,725, the cutting means, comprising a horizontally disposed reciprocating knife adapted to cut or shear the waste from the material directly adjacent one of the embroidered or stitched edges while such material is moving in a substantially horizontal plane is described and claimed, and inasmuch as our present improvements relate to and include a machine organized in substantially the same way for accomplishing substantially the same work or operation, such structure and its operation will be referred to herein. The knife is carried by suitable means mounted so as to be reciprocable and said knife is arranged to work diagonally with respect to the line of movement of the material to be trimmed, being so disposed as to cut on the upper side of the fabric directly adjacent one of the embroidered or stitched edges of the same and completely remove the strip of embroidery from the rest of the fabric (or the waste from the embroidered edge) without leaving an unsightly raw edge and without damaging in any way said embroidered or stitched edge; the fabric while being cut being so disposed that the knife operates below the embroidered edge, so to speak.

In the drawings, 1 represents a bed plate, suitably supported, upon which the operating mechanism is mounted, and 2 a supplemental bed or table over which embroidered fabric may be passed from a suitable source (not shown). The cutting or shearing of the waste from the embroidered edge takes place on the table 2.

In the present embodiment of our invention, a machine capable of trimming a single edging is shown, but it will be understood that a plurality of cutting mechanisms with the necessary operating means may be provided for operation upon a plurality of edgings.

Slidably mounted in ways 5 formed in a suitable bracket 6, which may be carried by the bed plate 1, is a combined guide and guard 7 for a cutting blade 8. This cutting blade is in the form of a very thin strip of metal, which may be wound upon a hub 10 carried by a spindle 11 journaled in a suitable support 12 carried by said guide 7, and the carrying means for said knife may have a fixed relation with respect to the guide. The guard and guide carrying the cutting blade may be arranged to be reciprocated in the ways 5 in said bracket 6; motion for this purpose being imparted by an arm 15 connected to an eccentric 16 driven by a shaft 17 suitably journaled on the bed plate 1 and driven by a belt 18 passing over a pulley 19; the belt extending from a suitable source of power (not shown).

The arm 15 may be secured to the rear end of the guard or guide 7 before referred to, and the eccentric may have a strap with a rounded surface to engage a hub with a similar surface; such elements providing substantially a ball and socket joint whereby the straight shaft 17 may impart angular movement to the guide 7 disposed diagonally with respect thereto. This construction is fully shown and described in our application, Serial No. 528,725. At the same time that reciprocating motion is imparted to the guard or guide 7, the knife or blade 8 is fed gradually forward so that its active cutting edge is being constantly renewed to insure positive and effective trimming of the waste from the embroidery edging in a proper manner.

The driving means may consist of a shaft 20, with universal couplings 21 connecting it to a shaft 22 having a gear wheel 23 which in turn is driven by a pinion 24 mounted so as to receive movement from a countershaft 25 through the medium of a gear wheel 26 and pinion 27. The main driving shaft 28 may be vertically disposed and carry a worm 29 meshing with a worm wheel 29ª whereby movement may be imparted to a shaft or spindle 30 journaled on the bed-plate 1 and having a pinion 31 meshing with a gear wheel 32 mounted on a shaft or spindle 33 having a pinion 34 meshing with a gear wheel 35 on said shaft 25. The movement of the shaft 25 is so proportioned that the feed of the knife is very gradual, and such movement is transmitted to the knife by means of pinions 36, 37, 38 and 39, driving a pair of friction rollers 40 and 41 between and by which the knife blade is fed. The knife blade is rolled under tension that tends to confine the same to its hub, and it is drawn off by the friction rolls 40 and 41 against the force of such tension.

In the present machine we provide means whereby the positively fed and reciprocating knife may be kept in proper alinement with the anvil against which the cutting operation takes place, and to this end we provide friction rollers 45 clearly shown in Figs. 2, 4, 7 and 17; the object and purpose of which is to engage the beveled cutting portion of the knife blade and keep the same in proper alinement; the construction being such that space is provided for the passage of the cutting edge without danger of injuring the same. These rollers are clearly shown in the enlarged plan view, Fig. 7; a sectional elevation of the same being shown in Fig. 17. They comprise a pair of disks 46 with beveled edges between which are placed a spacing element 47 whereby said disks are separated at their edge the desired distance to receive the edge of the knife blade, and these disks are rotatably mounted upon suitable pins 48 carried by suitable means, and are confined together by set screws 49. Two of said rollers 45 are carried by a bracket 50 supported by the guide 7 in advance of the cutting operation, while the third roller is carried by a bracket 51 secured to the table 2 at a suitable place beyond the point where the cutting operation takes place.

The fabric is delivered across the table 2, and is fed, by suitable means hereinafter described, under tension and at the proper angle, and the knife blade 8 as it is reciprocated by the guide or guard 7 acts in a horizontal direction directly against the fabric adjacent the embroidered or stitched edge of the same, such blade acting upon the upper side of the fabric and co-acting with the beveled edge of a plate 55 mounted on the table 2; such beveled edge being in absolute parallelism with the edge of the cutting blade. This plate 55, which may be adjustably mounted and may have its position regulated through the medium of suitable screws, hereinafter described, forms an anvil or shear plate with which the blade 8 may coact.

A materially advantageous result may be attained by having the beveled edge of the anvil or shear plate under sufficient tension to cause it to substantially engage the knife or cutting blade before any work is introduced, a condition which insures proper coaction of the blade when the goods are introduced. By this means an automatic or self-regulation of the coacting cutting means; the cutting blade and shear plate, can be effected, and any kind of goods, whether thick or thin, can be accommodated and successfully operated upon. At the same time the yielding edge of the shear plate will conform to the cutting blade and take up any irregularity that may occur therein. The active edge of the cutting blade and the edge of the shear plate are preferably disposed in absolute parallelism.

In the present instance the beveled edge of the anvil or shear plate 55 is provided with a spring tongue or finger 56, so disposed as to underlie the fabric at the cutting point; said finger having a suitably formed end 57, angular if desired, secured to said anvil by a screw 58; said finger having its opposite end turned up at 59 to facilitate introduction of the fabric. The anvil is mounted on top of a plate 60 set in the table 2 and is adjustable on the same with respect to the cutting blade. The plate 60 is slotted at 61 and a clamping member 62 underlies such slot; being held to the anvil by screws 63. At the end of the anvil is an abutment 64 secured to the table 2 and carrying screws 65 bearing against the end of the anvil. By loosening the screws 63, and releasing the clamping member 62 the anvil is free to be moved longitudinally, which action may be accomplished by hand away from the cutting blade when the screws 65 are backed off, and toward the cutting blade by said screws 65. In lieu of a pair of screws 65, a single screw may be employed.

During reciprocation of the guide or guard 7 in which the knife blade 8 is mounted, any tendency of the same to rise from the table 2 and from proper contact with the fabric during the cutting operation will be restrained by a suitable stop member. In the present instance, such member may consist of a roller 67 contacting with the blade and carried by a bracket 68 suitably mounted with respect to the rest of the mechanism.

The cutting action is substantially the same as described in our prior application before referred to, and as the embroidered edge of the fabric to be trimmed is sufficiently stout or heavy, the knife will shear close up the same, cutting in a substantially horizontal plane; the fabric directly at the point of severance adjacent the embroidered edge tending to assume a substantially vertical position and the knife operating below the raised embroidered edge.

In practice the edge of the cutting anvil is preferably maintained a slight distance away from the edge of the cutting blade, say two or three one-thousandths of an inch; sufficient, however, to prevent contact and hence dulling of the blade, and suitable means may be employed to accomplish this result.

Figure 1:
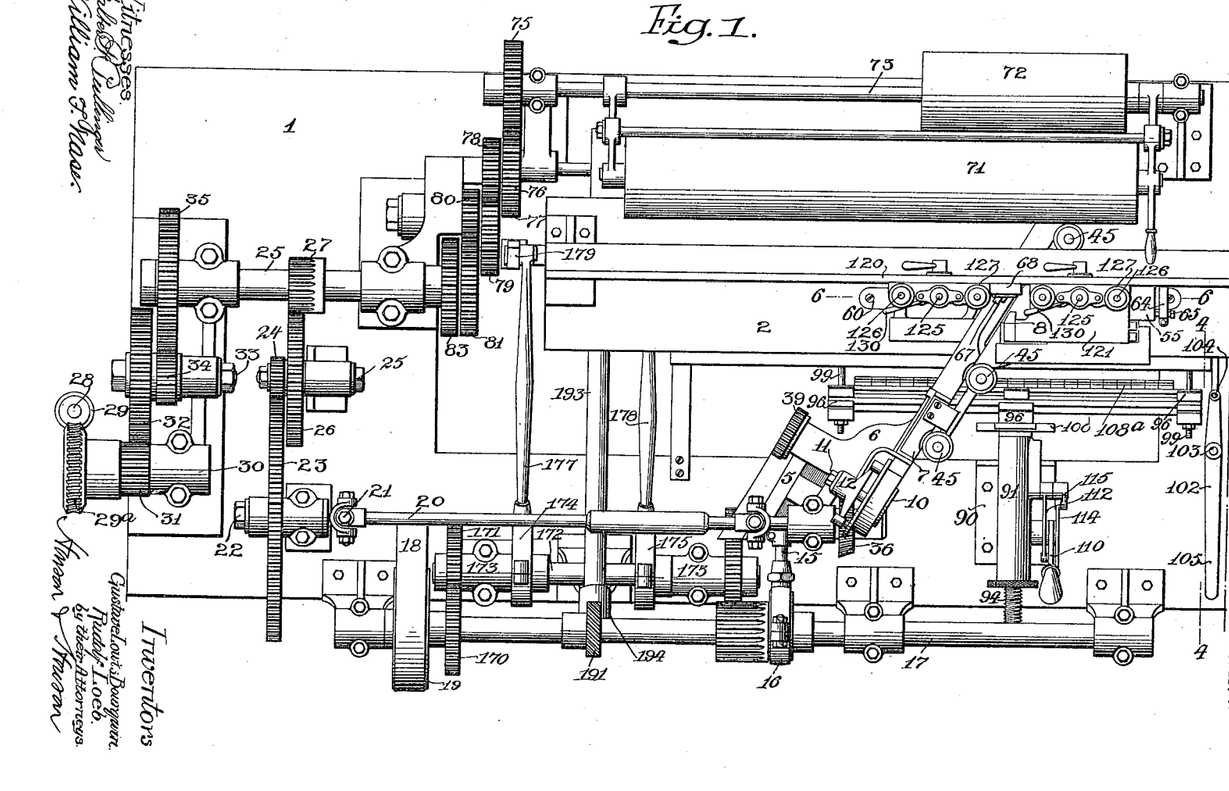
Figure 1, is a plan view of apparatus for trimming embroidery edging having and containing the features forming the subject of our present invention.
Figure 2:
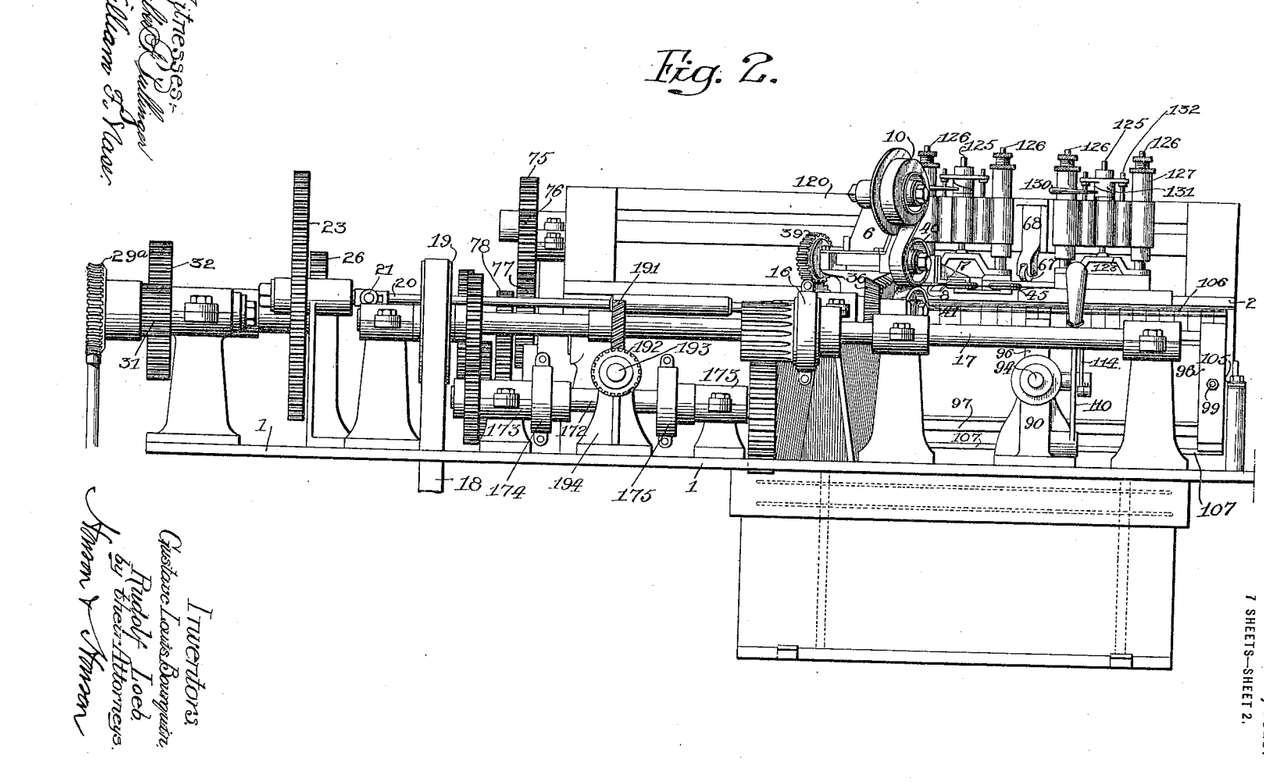
Fig. 2 is a front elevation of the same.

As the work progresses the main body of the fabric containing the embroidered edges to be trimmed, with the waste, passes between rollers 70 and 71, and may be delivered to a suitable receptacle (not shown). Tension may be provided for the roller 70, by having the roller 71 weighted, with a friction roller 72 adjacent thereto; the friction roller being mounted on a driven shaft 73 and imparting movement to the roller 71 which in turn is imparted to the roller 70. The roller 72 may be driven from the shaft 25 by means of pinions 75, 76, 77, 78, 79, 80, 81, 82 and 83, as clearly indicated in Figs. 1 and 2. The knife lies between the walls of the guard or guide 7 with its edge preferably in absolute parallelism therewith and with the spring element carried by the plate or anvil 55; the said guard being cut away at 85 at the point where the knife acts.

The material to be trimmed is fed to the table 2 where the cutting operation takes place from below, and in order that it may be kept taut during the feeding operation the following means may be employed: Mounted on the frame of the machine is a bracket 90, having a tubular portion 91 in which is disposed a stem 92 having a suitable shoulder 93 between which and the end of a hollow threaded plug 94 adjustable in said tubular member is a suitable spring 95, designed to hold tension means in contact with the material as it is delivered to the cutting point. These tension means may be positively moved to a retracting position by means to be described.

The tension device comprises a frame consisting of a plurality of members 96 connected by bars 97, the end members 96 being connected to a board 98 over which the goods pass, by guiding bolts or pins 99; the whole structure, including said board being movable at right angles to the stem 92. For this purpose the latter carries a cross piece 100 with beveled edges adapted to guides 101 carried by the central member 96. To impart lateral movement to this tension device we provide a lever 102 pivoted to the table 1 at 103, and connected to the board 98 at the point 104; said lever having a handle 105 whereby it may be readily operated.

Carried by the cross bars 97, are plates 106 and 107 arranged to bear against the fabric as it passes over the board 98, between the bolts 99. The lower plate may be continuous with a plurality of spring fingers 108 also carried by a bar 97 bearing against the same. The upper bearing member or plate 106 is preferably made of small sections, with individual spring fingers 108$^a$ bearing against the same.

As the fabric passes over the table 2 its surface is slightly changed in view of the fact that the feeding means lie in different planes, as hereinafter explained, and to compensate for this condition and insure an even delivery of the material, a portion of the table 2 is provided with a curved edge 109 adjacent the lowest portion of the feed mechanism.

The tension device is held in contact with the material passing over the board 98 by the spring 95 surrounding the stem 92 within the tubular member 91. This device is adjustable longitudinally so as to bring the embroidered edge of the material in the proper position to be trimmed; such adjustment being possible after it has been clamped against the board 98. To retract said tension device, we provide a handle 110 pivoted at 111 to the bracket 90 and carrying a link 112 which is connected to a pin 113 carried by the stem 92. In order to lock this handle in the retracted position, we provide a pair of supplemental links 114 and 115 pivotally connected together at 116, the other end of the link 114 being pivoted to the handle, while the end of the second link 115 is loose on the pin carried by the stem.

To effect movement of the material across the table 2, the following mechanism is provided: Carried by a bar 120 extending across the machine are a series of spring presser feet 121 and 122; the presser feet 121 acting upon the goods carrying the embroidered or festooned edge, while the presser feet 122 act upon the waste. The presser foot 121 comprises an arch-shaped element 123 carried by a bracket 124 having a guiding stem 125. The presser foot in addition carries stems 126 adapted to tubular portions of its carrier 127 mounted on the bar 120 and provided with springs 128 tending to hold the presser foot in the lowered position and in contact with the goods.

To raise the presser foot, in order that the goods may be inserted beneath the same, cams 129 are provided encircling the stem 125 and provided with an operating handle 130, such cams resting upon the carrier and engaging a cross-piece 131, which may be provided with stems 132 adapted to recesses 133 in said carrier and maintained in the lowered position by springs 133$^a$.

The presser foot 122 and its operative mechanism is substantially the same as the presser foot 121, except that element 123$^a$ is disposed for contact with the goods in a lower plane than the element 123, and in addition is recessed at 134 for the passage of the waste. Both of the carriers 127 are adjustable on the bar 120 to any desired position and they may be locked by suitable nuts 135.

The table 2 over which the material passes during the trimming operation is provided with a plurality of feeding elements which have pairs of operating faces lying in juxtaposition with respect to each other, a portion of which is movable toward and from each other, and in addition carry other elements which have movement at right angles to the first mentioned movement.

For the purpose of giving the fabric containing the edge from which the waste has been removed a divergent movement so that the latter is carried away from the cutting point at an angle with respect to the waste, these feeding devices are disposed in two planes; the upper plane taking care of the waste, while the lower plane takes care of the fabric containing the embroidered edge. This portion of the apparatus is fully shown in Figs. 1 and 7, and in the perspective views, Figs. 5, 8, 9 and 10.

Disposed beneath the table and arranged for vertical movement under the action of suitable cams hereinafter described, is a pair of frames 140 and 141 disposed in the same plane; each of said frames comprising a side bar 142, 142$^a$, and laterally extending bars 143, 143$^a$, in the present instance four in number; each of said laterally extending bars having an undercut rib 144, 144$^a$. The end bars of each frame carry guide rods 145, 145$^a$, while all of the bars carry depending projections 146, 146$^a$, with which cams 147, 147$^a$ for raising the same contact.

The feeding devices proper comprise frames 150 and 150$^a$. The frame 150 consists of a side bar 151 arranged in two planes, with a recess 152 between the portions in different planes for the reception of a portion of the anvil. Opposite the bar 151 is a short fixed bar 153 having its upper operating face in a plane higher than the portion having the highest plane of the bar 151 on the opposite side, and being connected therewith by cross bars 154, with undercut edges 155 adapted to the undercut ribs of the frames 140 and 141. On the same side of the frame and in line with the short bar 153 is a movable bar element 156 in the same plane as the portion of the bar 151 in the lowest plane on the opposite bar of the frame, and this bar carries a rod 157 on its under side adapted to apertures in projections 158 carried by the cross bars whereby it may move with respect thereto.

The frame 150$^a$ is constructed in substantially the same manner as the frame 150, with the exception that it carries six bridging elements or cross bars 154ᵃ instead of four, said cross-bars 154ᵃ being undercut in the same manner as the cross-bars 154 of the frame 150. This frame 150ᵃ also carries a movable piece 156ᵃ which lies adjacent the piece 156 of the frame 150.

The frame 150ᵃ is given a lateral movement by means of oscillating arms 160 operated in a manner hereinafter described, said arms engaging ears 161 on the under side of the same; the frame 140 being reciprocated in relation to the frame 141, and during this reciprocatory movement the member 156 is moved at right angles thereto by the engagement of its ends 165 and 166 with cams 167 and 168, properly disposed for contact therewith. At the same time the member 156ᵃ is also moved by contact of its ends 165ᵃ and 166ᵃ, with cams 167ᵃ and 168ᵃ. In use the frames 150 and 150ᵃ lie directly adjacent each other and their upper operative faces are roughened as indicated to insure proper engagement with the fabric.

Figure 3:
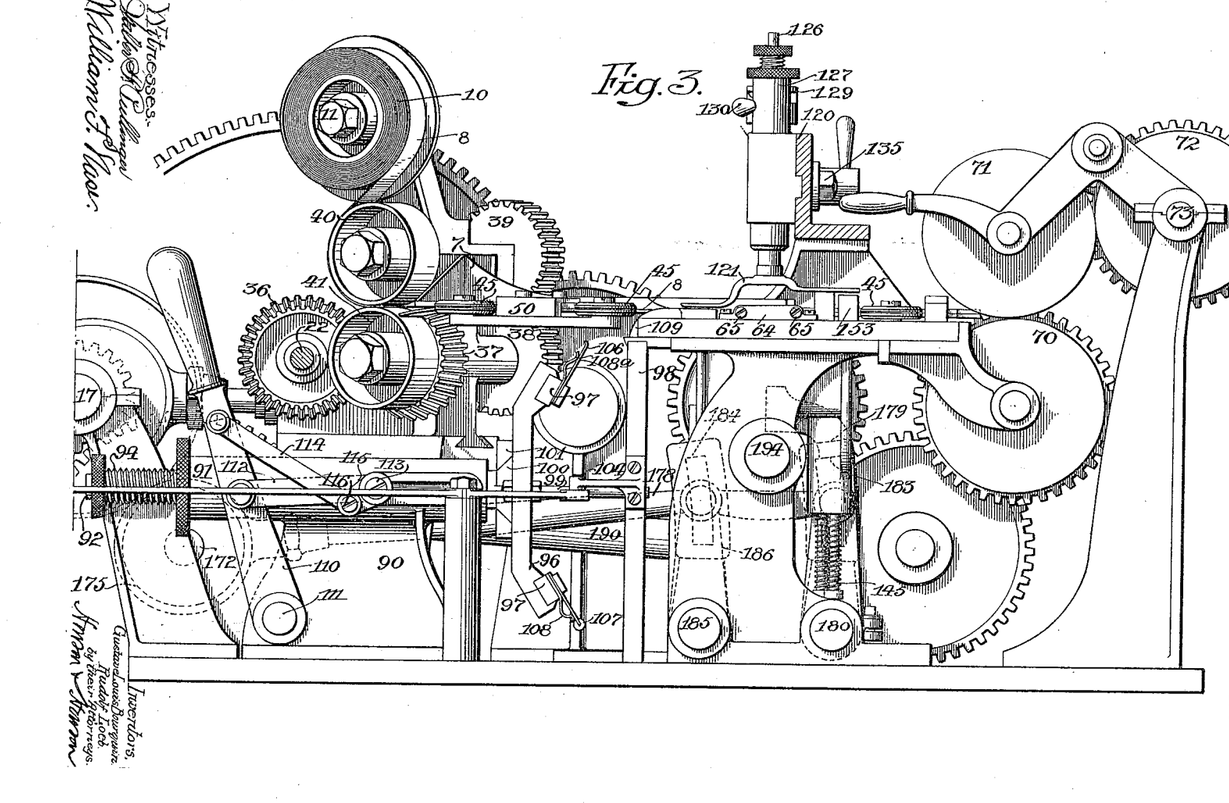
Fig. 3, is an enlarged end elevation of a portion of the structure.
Figure 4:
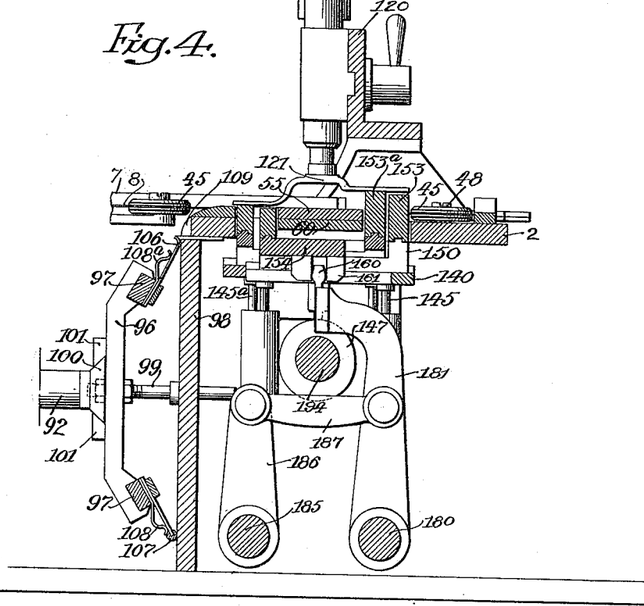
Fig. 4, is a sectional view on the line 4—4, Fig. 1.
Figure 5:
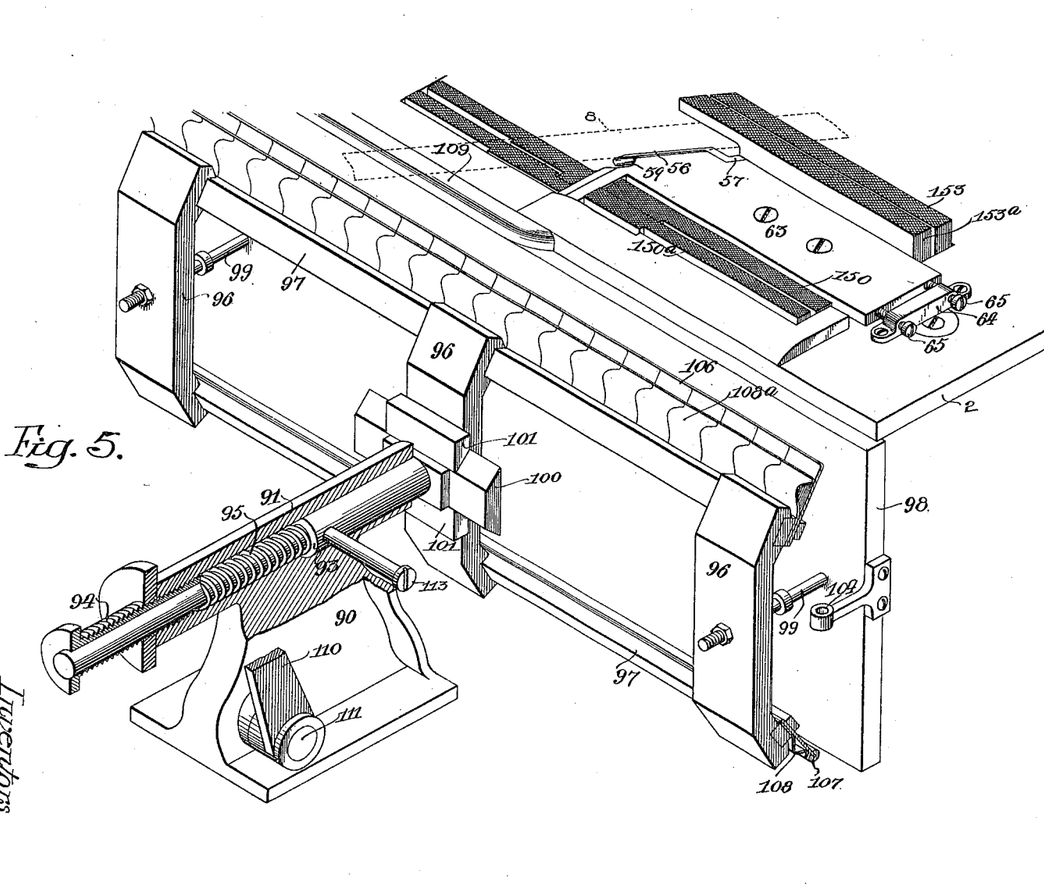
Fig. 5, is a perspective view of the fabric guiding and tensioning means.
Figure 6:
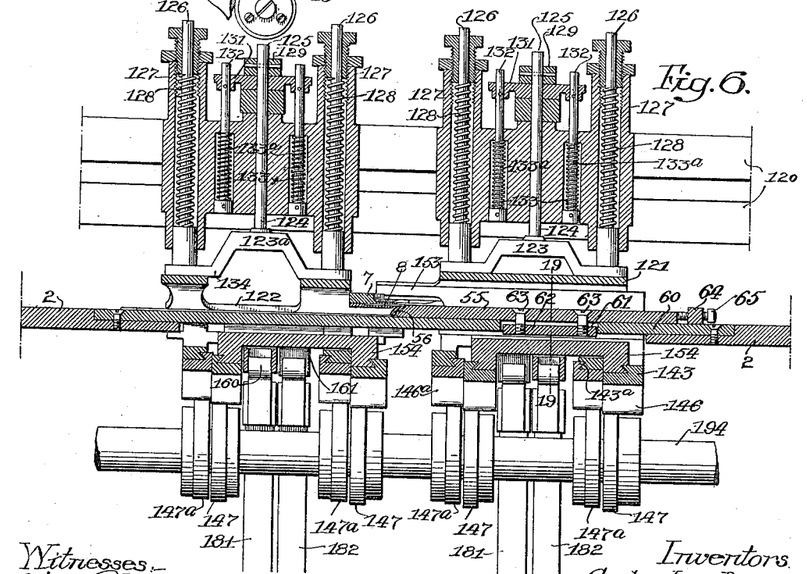
Fig. 6, is an enlarged sectional elevation on the line 6—6, Fig. 1, showing the fabric feeding means.
Figure 7:
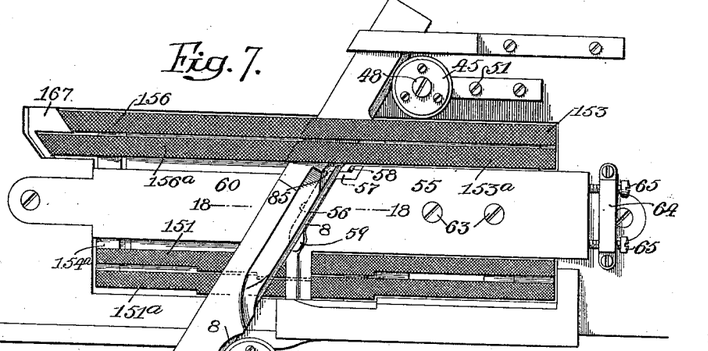
Fig. 7, is an enlarged plan view of a part of the fabric feeding means, showing its position with relation to the cutting blade.
Figures 8, 9, 10, 11, 12, 13:
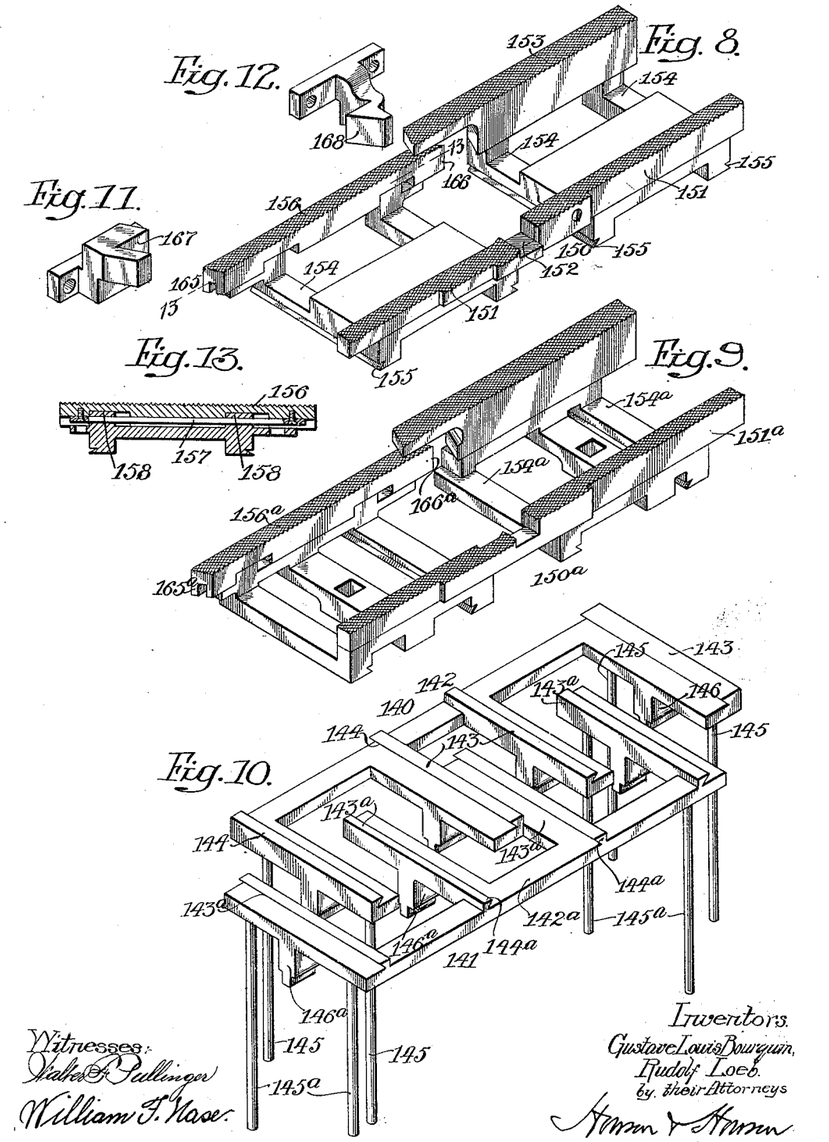
Figs. 8, 9, 10, 11 and 12, are perspective views illustrating details of the fabric feeding means.
Fig. 13, is a sectional view on the line 13—13, Fig. 8.
Figure 14:
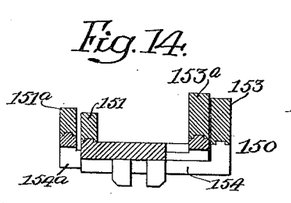
Figs. 14, 15 and 16, are diagrammatic views illustrative of the action of the feeding means.
Figure 15:
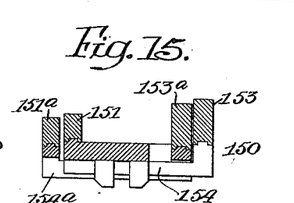
Figure 16:
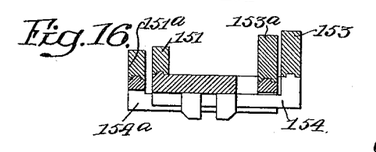
Figures 17, 18:
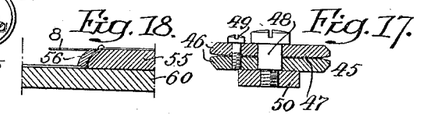
Figs. 17 and 18, are sectional views of elements relating to the cutting mechanism, the latter being taken on the line 18—18.
Figure 19:
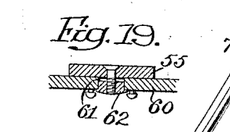

The means for operating the fabric feeding devices simultaneously with the cutting of the fabric are substantially as follows, referring particularly to Figs. 3 and 4, and the diagrammatic views 14, 15 and 16. The shaft 17, through the medium of gears 170 and 171, imparts motion to a shaft 172 mounted in bearings 173 on the bed plate 1 and carrying eccentrics 174 and 175, having connecting rods 177 and 178. The eccentric 174, through its connecting rod 177 and a lever or arm 179 to which said connecting rod is attached, actuates a shaft 180 having arms or levers 181 and 182. The lever or arm 179 may have a slotted head 183 to allow for adjustment with the connecting rod 177 when a change of motion is desired; these latter parts being shown more clearly in Fig. 3.

The eccentric 175, through its connecting rod 178 and a lever or arm 184 corresponding in character to the lever 179, actuates a shaft 185 carrying arms or levers 186 which are connected to the arms or levers 182, by means of links 187. The eccentrics 174 and 175 are so connected to the shaft 172 that motion imparted to the arms or levers 179 and 184 causes the shafts 180 and 185 to rock in opposite directions. The arms or levers 181 are fixed to the shaft 180 and are actuated thereby, while the arms or levers 182 are loosely mounted on said shaft 180 and are actuated by the shaft 185 through the medium of the links 187. The arms 181 and 182 have at their upper ends extended portions 160 for engagement with ears 161 of the frames 150 and 150ᵃ.

The supplemental table 2 is preferably apertured at 190, through which the engaging surfaces of the feeding elements project into contact with the material fed across said table.

The shaft 17 carries a spiral gear 191 which may mesh with a similar gear 192 on a shaft 193, supported in bearings 194. The shaft 193, through suitable gearing, drives a cam shaft 194, which may be journaled in bearings formed in the supports for the table 2. The shaft 194 carries the sets of cams 147, 147ᵃ arranged to raise and lower the frames 140 and 141, whereby the contacting portions 150 and 150ᵃ may be moved into and out of contact with the material to be fed; coöperating with the presser feet 121 and 122.

We claim:

1. In an embroidery cutting or trimming machine, the combination of means for supporting edged material to be trimmed in a substantially horizontal position, cutting means for engagement with such edge including a horizontally reciprocating knife engaging the fabric in a substantially horizontal plane, means combined with said supporting means for feeding such material across the same, and means laterally movable with respect to the line of draft of the material operated upon for simultaneously carrying the embroidered and waste strips in divergent paths.

2. In an embroidery cutting or trimming machine, the combination of means for supporting edged material to be trimmed in a substantially horizontal position, cutting means for engagement with such edge including a horizontally reciprocating knife engaging the fabric in a substantially horizontal plane, means for reciprocating said knife, means for feeding said knife during its reciprocations, and automatically operated presser feet disposed in a plurality of planes and combined with said supporting means for engaging said material to feed the same.

3. In an embroidery cutting or trimming machine, the combination of means for supporting edged material to be trimmed in a substantially horizontal position, cutting means including a horizontally reciprocating knife, means for reciprocating said knife during the feeding movement, means for feeding said knife during its reciprocations, said knife engaging the fabric in a substantially horizontal plane and being mounted to move in a line diagonally with respect to the material operated upon, and automatically operated presser feet disposed in a plurality of planes for moving the fabric.

4. In an embroidery cutting or trimming machine, the combination of a work table, cutting means including a horizontally reciprocating knife mounted adjacent said work table, means for reciprocating said knife in a substantially horizontal plane diagonally with respect to the work to be operated upon, means for feeding said knife during its reciprocations, and presser feet disposed in a plurality of planes for feeding said work simultaneously with the movement of the knife.

5. In an embroidery cutting or trimming machine, the combination of a suitable work table, means for supporting the fabric in a substantially horizontal position over said table, a cutting blade mounted for substantially horizontal engagement with said work, means for feeding said cutting blade, means for reciprocating said blade during the feeding movement, means for feeding the fabric simultaneously with the movement of the cutting blade, an anvil, and a flexible guide for the fabric adjacent said anvil.

6. In an embroidery cutting or trimming machine, the combination of a suitable work table, means for supporting the fabric in a substantially horizontal position over said table, a continuous knife blade mounted diagonally with respect to the work, a shear plate or anvil coacting therewith, means for reciprocating said knife blade, presser feet for moving the fabric during the cutting operation, and means for carrying away the separated portions of the work at divergent angles after it has been cut.

7. In an embroidery cutting or trimming machine, the combination of a suitable frame, a work table carried thereby, means for supporting the work in a substantially horizontal position over said table, a cutting blade, a guide for said blade, means including a guide for the material coacting with said blade to trim the embroidery, means for reciprocating said guide, means for feeding said knife during the reciprocations of said guide and presser feet disposed in a plurality of planes for feeding the fabric during the cutting operation.

8. In an embroidery cutting or trimming machine, the combination of a work table over which the fabric to be trimmed is passed in a substantially horizontal position, a guide, a continuous blade disposed in said guide, means for reciprocating the guide across said table, means for feeding the knife through the guide simultaneously with the cutting action, and means for automatically feeding the material as the knife acts including laterally movable devices to discharge the trimmed and untrimmed material at divergent angles.

9. In an embroidery cutting or trimming machine, the combination of a work table over which the fabric to be trimmed is passed in a substantially horizontal position, a guide, a continuous blade disposed in said guide, means for reciprocating the guide over said work table, means for gradually feeding the knife through the guide simultaneously with the reciprocation thereof, such feed taking place independently of such reciprocation, and presser feet disposed in a plurality of planes and combined with said work table for actuating said fabric as the knife blade acts.

10. The combination of a driven shaft, an eccentric carried thereby, a slide-way, a guide arm having a portion reciprocable in said slide-way, a knife carried by said guide arm, a connection between said eccentric and guide arm, said eccentric having a curved surface permitting lateral as well as reciprocatory movement of said connection, presser feet for engagement with the upper surface of the fabric for moving the same simultaneously with the operation of the knife, and feed devices below said presser feet movable laterally with respect to the line of draft of the material operated upon for imparting divergent movement to the embroidered edge and the waste from the cutting point.

11. In an embroidery cutting or trimming machine, the combination of a work table, a horizontal shear plate carried thereby, a horizontally disposed blade arranged to reciprocate adjacent said shear plate in a horizontal plane, means for reciprocating said blade, means for feeding said blade simultaneously with the reciprocation thereof, and presser feet disposed in a plurality of planes for moving the fabric.

12. The combination of a horizontal work table, a horizontal shear plate carried thereby, a cutting blade arranged to reciprocate in a horizontal plane across said table adjacent and in substantial engagement with the shear plate, means for reciprocating said cutting blade, means for feeding said blade simultaneously with the reciprocation thereof, presser feet disposed in a plurality of planes for feeding the fabric simultaneously with the cutting action of the knife, and means below the presser feet for discharging the trimmed embroidery and waste at divergent angles.

13. In an embroidery cutting or trimming machine, the combination of means for supporting edged material to be trimmed, cutting means for engagement with such edge including a horizontally reciprocable cutting blade, means for reciprocating said blade, means for feeding the same during its reciprocations, means for feeding material across the support, means for holding the cutting blade against vertical movement, and lateral guiding means for the cutting edge of said blade.

14. In an embroidery cutting or trimming machine, the combination of means for supporting edged material to be trimmed, cutting means for engagement with such edge including a horizontally reciprocable cutting blade, a guide for the same, means for feeding material across the support in a plurality of planes, means for maintaining the knife holding guide against vertical movement, and guiding rollers for the cutting edge of said blade.

15. In an embroidery cutting or trimming machine, the combination with cutting means adapted to engage the embroidered edge of the fabric, of feeding means comprising a plurality of presser feet and coacting members, means for operating said feeding elements, means for alternately engaging and disengaging said elements with the work, and means for imparting movement laterally with respect to the line of draft of the material operated upon to a portion of said feeding elements to effect divergent movement of the embroidered edge and the waste from the cutting point.

16. In an embroidery cutting or trimming machine, the combination with cutting means adapted to engage the embroidered edge of the fabric, of feeding means comprising vertically movable feeding members above the material and oscillating elements below the same, means for operating said feeding members, means for alternately engaging and disengaging said members with the work, and means for imparting lateral movement to a portion of the devices below the work.

17. In an embroidery cutting or trimming machine, the combination with a reciprocating knife, of an anvil plate coacting therewith, a guide for the material carried by said anvil, means for adjusting the edge of said anvil and guide with respect to the cutting knife, and means for locking such adjusting means.

18. In an embroidery cutting or trimming machine, the combination with a continuous reciprocating knife, of an adjustable anvil plate, a flexible guide carried by the edge of said anvil for coaction with said knife, means for adjusting said anvil and guide with respect to the cutting knife, and means for locking such adjusting means.

19. In an embroidery trimming machine, the combination of a work table over which the goods are passed, a knife for trimming waste from the embroidered edge of the same, an independent surface over which the goods are passed, a laterally adjustable tension device for engaging the goods against said surface, spring fingers carried by the tension device, and tension means for holding the same in contact with the goods.

20. In an embroidery trimming machine, the combination of a work table over which the goods are passed, a knife for trimming waste from the embroidered edge of the same, a surface at right angles to the table over which the goods pass, a tension device for engaging the goods upon said surface, means for moving said tension device from and toward the goods, means for locking the same in the retracted position, and means for holding the same in contact with the goods.

21. In an embroidery trimming machine, the combination of a work table over which the goods are passed, a knife for trimming waste from the embroidered edge of the same, a surface at right angles to the table over which the goods pass, a laterally adjustable tension device for engaging the goods, spring fingers carried by the same, means for moving said tension device from and toward the goods, means for locking the same in the retracted position, means for holding the same in contact with the goods, and a lever for laterally adjusting the same.

22. In an embroidery trimming machine, the combination of a plurality of feed plates arranged in sets, means for laterally vibrating said feed plates with respect to each other, and means for imparting longitudinal movement to a portion of said feed plates to effect a divergent movement of a portion of the material operated upon.

23. In an embroidery trimming machine, the combination of a plurality of feed plates arranged in sets, means for laterally vibrating said feed plates with respect to each other, means for imparting longitudinal movement to a portion of said feed plates to effect a divergent movement of a portion of the material operated upon, said elements being vertically movable with respect to each other, a shaft, and cams carried by said shaft for effecting such movement.

24. In an embroidery trimming machine, the combination of a plurality of feed plates arranged in sets, means for laterally vibrating said feed plates with respect to each other, cams for imparting longitudinal movement to a portion of said feed plates simultaneously with the vibration of the same to effect a divergent movement of a portion of the material operated upon, said elements being vertically movable with respect to each other, a shaft, and cams carried by said shaft for effecting such vertical movement.

25. In an embroidery trimming machine, cutting means, fabric feeding devices comprising a rail, a series of presser feet carried by said rail, vibrating feeding elements underlying said presser feet, means for imparting movement laterally with respect to the line of draft of the material operated upon to effect divergent movement of the embroidered edge and the waste from the cutting point, means for adjusting said presser feet along the rail, and means for raising and lowering said presser feet.

26. In an embroidery trimming machine, fabric feeding devices comprising a rail, a series of presser feet having engaging portions in different planes carried by said rail, vibrating feeding elements underlying said presser feet, means for adjusting said presser feet along the rail, and means for raising and lowering said presser feet.

27. In an embroidery trimming machine, fabric feeding devices comprising a rail, a series of presser feet having engaging portions in different planes carried by said rail, vibrating feeding elements underlying said presser feet, means for adjusting said presser feet along the rail, means for raising and lowering said presser feet, means for raising and lowering the vibrating feeding elements, and tension means for the presser feet whereby they may be raised and lowered with the vibrating devices.

In testimony whereof, we have signed our names to this specification, in the presence of two subscribing witnesses.

GUSTAVE LOUIS BOURQUIN.
RUDOLF LOEB.

Witnesses:
JAMES W. REANEY,
WILDA B. BESSER.

Copies of this patent may be obtained for five cents each, by addressing the "Commissioner of Patents, Washington, D. C."